United States Patent [19]
Perrotti

[11] Patent Number: 5,265,140
[45] Date of Patent: Nov. 23, 1993

[54] INVERTED VANE MIXING GRID

[75] Inventor: Patrick A. Perrotti, Newington, Conn.

[73] Assignee: Combustion Engineering, Inc., Windsor, Conn.

[21] Appl. No.: 905,784

[22] Filed: Jun. 29, 1992

[51] Int. Cl.$^5$ ............................................. G21C 3/34
[52] U.S. Cl. ...................................... 376/439; 376/438; 376/441
[58] Field of Search ............... 376/439, 438, 441, 442, 376/462, 443; 976/DIG. 81, DIG. 78, DIG. 77, DIG. 71

[56] References Cited

U.S. PATENT DOCUMENTS

| | | | |
|---|---|---|---|
| 3,764,470 | 10/1973 | Calvin | 376/439 |
| 3,787,286 | 1/1974 | Anthony | 376/439 |
| 3,809,609 | 5/1974 | Krawiec et al. | 376/439 |
| 3,933,584 | 1/1976 | Litt | 376/439 |
| 4,539,738 | 9/1985 | Antol et al. | 29/467 |
| 4,844,860 | 7/1989 | Hatfield | 376/439 |
| 4,879,090 | 11/1989 | Perrotti et al. | 376/462 |

*Primary Examiner*—Donald P. Walsh
*Assistant Examiner*—Meena Chelliah
*Attorney, Agent, or Firm*—L. James Ristas; John H. Mulholland

[57] ABSTRACT

A nuclear fuel assembly grid (1) has a plurality of flat strips (10,12) that are orthogonally interlaced along vertical slots (38,60) through their upper or lower edges and welded together to form an egg crate-like array of four-walled cells (14) for receiving respective fuel rods (16), each cell including springs (20,30) and arches (32,34) projecting from the walls for contacting and supporting a respective fuel rod in the interior of the cell. At least some of the cells having flow deflection vanes (36,56) projecting integrally from a cell wall into the interior of the cell without contacting the fuel rod. Preferably, the vane is bent along a bend line (52) that is parallel to the upper edge (24) of the strip, into the interior of the cell, thereby forming an angle of between about 15 degrees and 30 degrees relative to the plane defined by the body, or plate portion of the strip.

13 Claims, 3 Drawing Sheets

INVERTED VANE MIXING GRID

BACKGROUND OF THE INVENTION

The present invention pertains to nuclear reactor fuel assemblies, and more particularly, to a fuel assembly grid of the type having structure dedicated to enhancing the mixing of coolant passing through the grid.

U.S. Pat. No. 4,879,090, "Split Vaned Nuclear Fuel Assembly Grid", issued Nov. 7, 1989 to Perrotti et al, discloses a nuclear fuel assembly grid having integral vanes with optimized size, shape and bend angles for maximizing coolant mixing and fuel rod heat transfer. Several other optimization features are also disclosed in said patent. The grid strips disclosed therein are similar to other flow-mixing grids, however, in that the vanes integrally project from the upper edge of each strip, generally toward the fuel rod. Despite the improved performance of the grid described in said patent relative to the grids available at the time the invention described therein was made, several fabrication and performance characteristics were identified as warranting further improvement.

One such area of desired improvement pertains to the inconvenience during fabrication, of making a joining weld between the intersecting strips, at the top of the intersection, in substantially the same location where the vanes project upwardly, e.g., the vanes tend to hide the upper strip intersection weld location. The second fabrication-related desire for improvement, arises from the extra care that must be taken when initially inserting fuel rods into the grid, and especially during fuel assembly reconstitution, to avoid damaging the cantilevered, projecting vanes.

With respect to desired performance improvements, it has been recognized that the presence of the upper strip intersection weld at the base of the mixing vanes, adversely affects the coolant flow immediately upstream of the vane, thereby reducing the vane effectiveness to some extent. Also, the cantilevering of the vane upwardly from the upper edge of the strip, permits leakage of some of the redirected coolant laterally of the longitudinal orientation of the vane, thereby also reducing the effectiveness of the desired mixing.

SUMMARY OF THE INVENTION

It is therefore an object of the present invention to provide a nuclear fuel assembly grid, and associated grid strips, which improve upon the fabrication and performance of mixing vane grids of the type having vanes which project upwardly from the upper edge of the strips.

A nuclear fuel assembly grid according to the present invention, has a plurality of flat strips that are orthogonally interlaced along vertical slots through their upper or lower edges and welded together to form an egg crate-like array of four-walled cells for receiving respective fuel rods, each cell including means projecting from each wall for contacting and supporting a respective fuel rod in the interior of the cell, wherein the improvement comprises at least some of the cells having flow deflection vanes projecting integrally from a cell wall into the interior of the cell without contacting the fuel rod. Preferably, the vane is bent along a bend line that is parallel to the upper edge of the strip, into the interior of the cell, thereby forming an angle of between about 15 degrees and 30 degrees relative to the plane defined by the body, or plate portion of the strip.

Although a grid in accordance with the present invention is likely to include several kinds of strips which differ in the details of the relationship of the slots, means for contacting and supporting the fuel rods, and number of vanes, each grid in accordance with the invention will include at least some strips of the following character. The inventive strips comprise a thin plate having a length and a substantially uniform height between upper and lower edges. A plurality of first cut-outs are spaced along the length of the plate substantially centrally between the upper and lower edges, each cut out defining a first cantilevered member bendable away from the plate to form a fuel rod spring support member. Upper and lower, integrally formed protrusions are situated above and below each of the first cut-outs, for defining fuel rod stop support members. A plurality of second cut-outs are spaced along the length of the plate, each of the second cut-outs situated between one of the first cut-outs (i.e., rod spring support members), and one of the strip edges. The second cut-outs define a second cantilevered member projecting toward the adjacent first cut-out and bendable away from the plate to form a coolant flow deflecting vane between the upper and lower strip edges. Preferably, the second cut-outs defining the deflecting vane, form a border with a substantially laterally adjacent, fuel rod stop support member.

The grid and strip in accordance with the present invention, address several of the deficiencies noted in the background portion of the present specification. With respect to fabrication, the locations of the upper strip intersection welds are no longer hidden, because the bend line, or base, of the vane is below the upper edge (e.g., between the fuel rod spring support and the upper edge), and the cantilevered projection of the vane extends downwardly. The downward projection of the vanes also facilitates the insertion of fuel rods into a new assembly, or new fuel rods into a reconstituted assembly, because the fuel rods can be inserted from the top, without causing significant deflection of a vane that may be inadvertently contacted. Furthermore, during normal handling of the fuel assembly or grid, the vanes are situated within the cells, and therefore not susceptible to handling damage.

With respect to performance improvements, the flow mixing effect occurs within the cell, upstream of the upper strip intersection welds, so that such welds do not adversely affect the mixing function of the vanes. Furthermore, the fuel rod and cell walls are laterally adjacent to the side edges of the vane within the cell, thereby significantly reducing side leakage and therefore producing a greater flow in the longitudinal direction of the vane. Another performance enhancement resulting from the present invention, is the presence of a passageway, formed by the cut-out for the vane, whereby some of the redirected coolant can pass from one cell to an adjacent cell, within the grid.

To minimize the spacer grid height resulting from incorporation of the vane within the grid cell, the upper fuel rod support arches preferably are at the same elevation as the vane. Providing the upper fuel rod support arch at an angle to the axis of the grid cell, eliminates the need for a crown and allows both ends of the arch to be solidly supported. Furthermore, in the assembled grid, a continuous strip of material is provided between the base of the vane and the upper edge of the strip, thereby improving through-grid buckling strength.

BRIEF DESCRIPTION OF THE DRAWINGS

These and other objects and advantages of the invention will be described below with reference to the preferred embodiment and the accompanying drawings, in which.

DESCRIPTION OF THE PREFERRED EMBODIMENT

Figure 1:
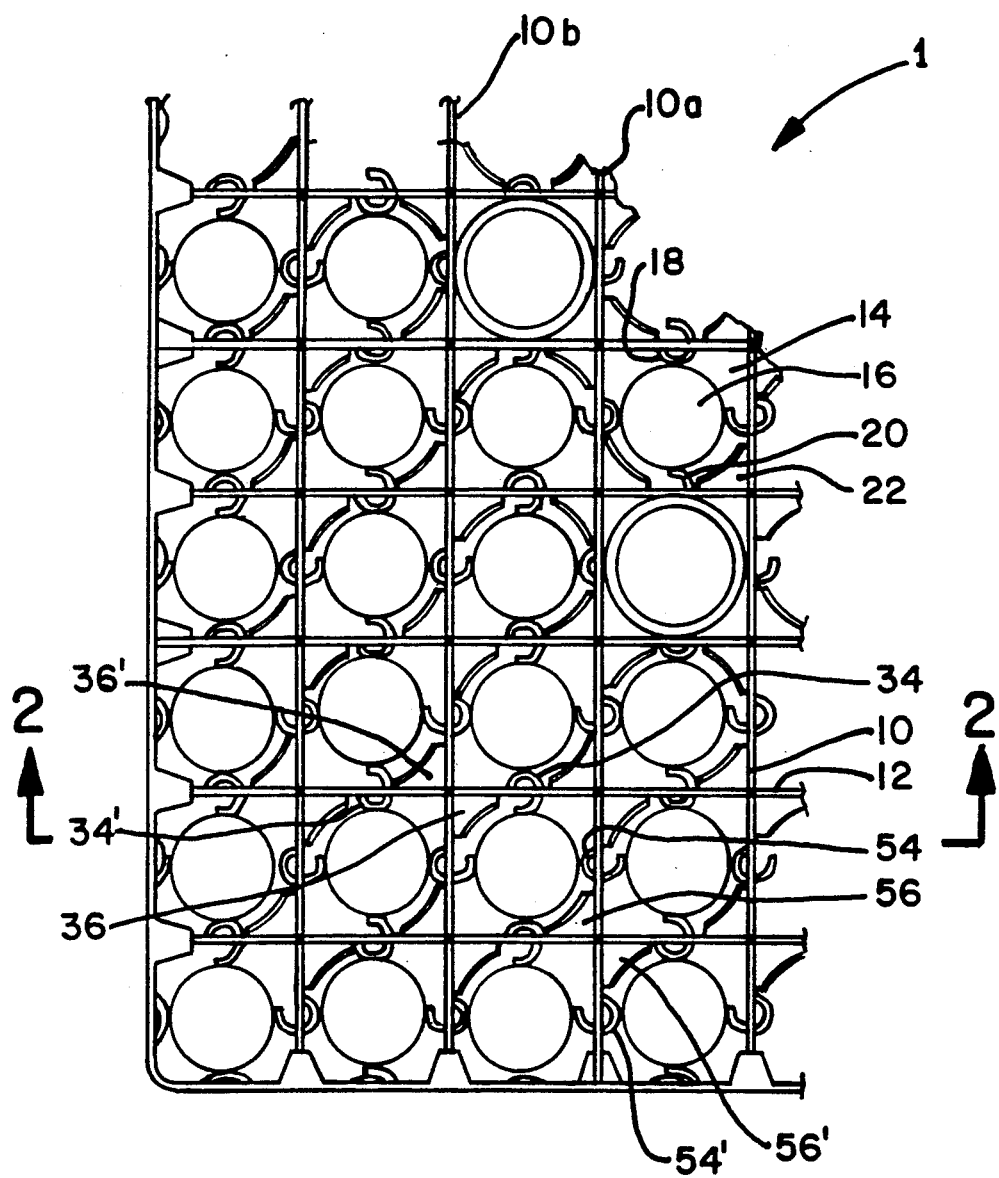
FIG. 1 is a plan view of a portion of a nuclear fuel assembly grid containing features of the present invention.

FIG. 1 shows a portion of a nuclear fuel assembly 1, in which a grid is formed from a plurality of substantially flat strips 10,12 that are orthogonally interlaced to form an egg crate-like array of four walled cells 14 for receiving respective fuel rods 16. Each cell containing a fuel rod 16, includes spring means 20 and hard stop means 18, projecting from the cell walls, for contacting and supporting the fuel rod 16 in the interior of the cell.

The features described in the preceding paragraph are conventional, and may be more fully understood from the disclosure of U.S. Pat. No. 4,879,090, the disclosure of which is hereby incorporated by reference.

Figure 2:
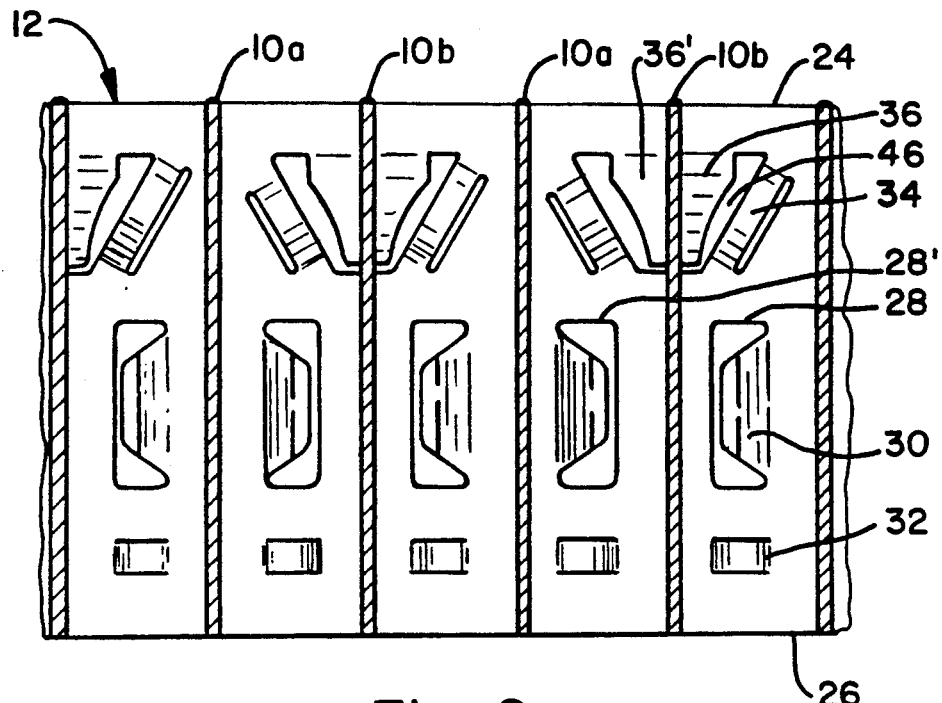
FIG. 2 is a section view, taken through line 2—2 of FIG. 1, with fuel rods removed, to reveal features of the present invention.
Figure 3:
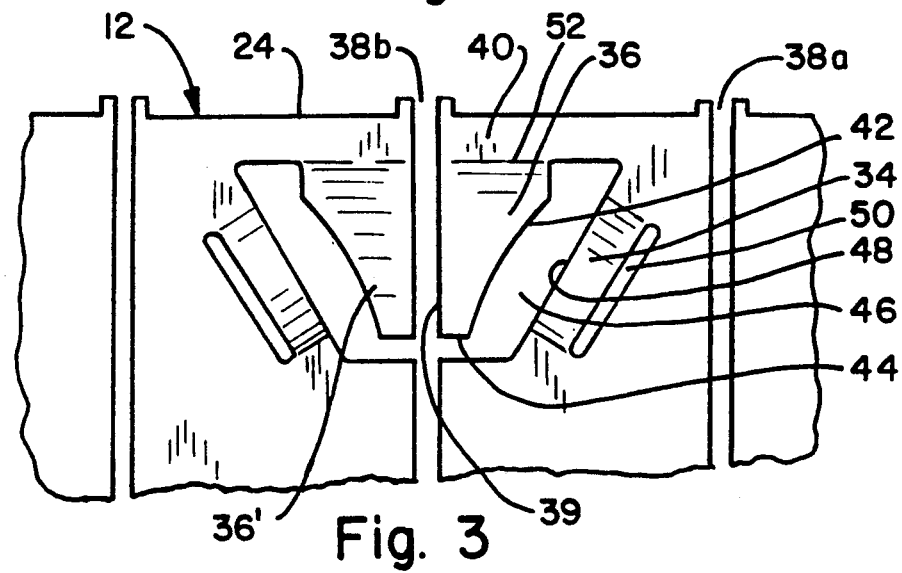
FIG. 3 is an enlarged view of a portion of the grid strip shown in FIG. 2.
Figure 4:
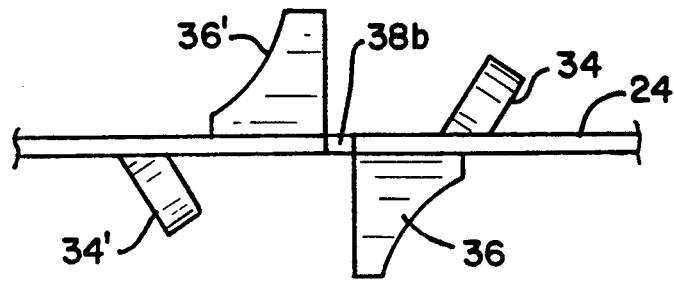
FIG. 4 is a plan view, showing the details of the features of the invention associated with FIG. 3.
Figure 5:
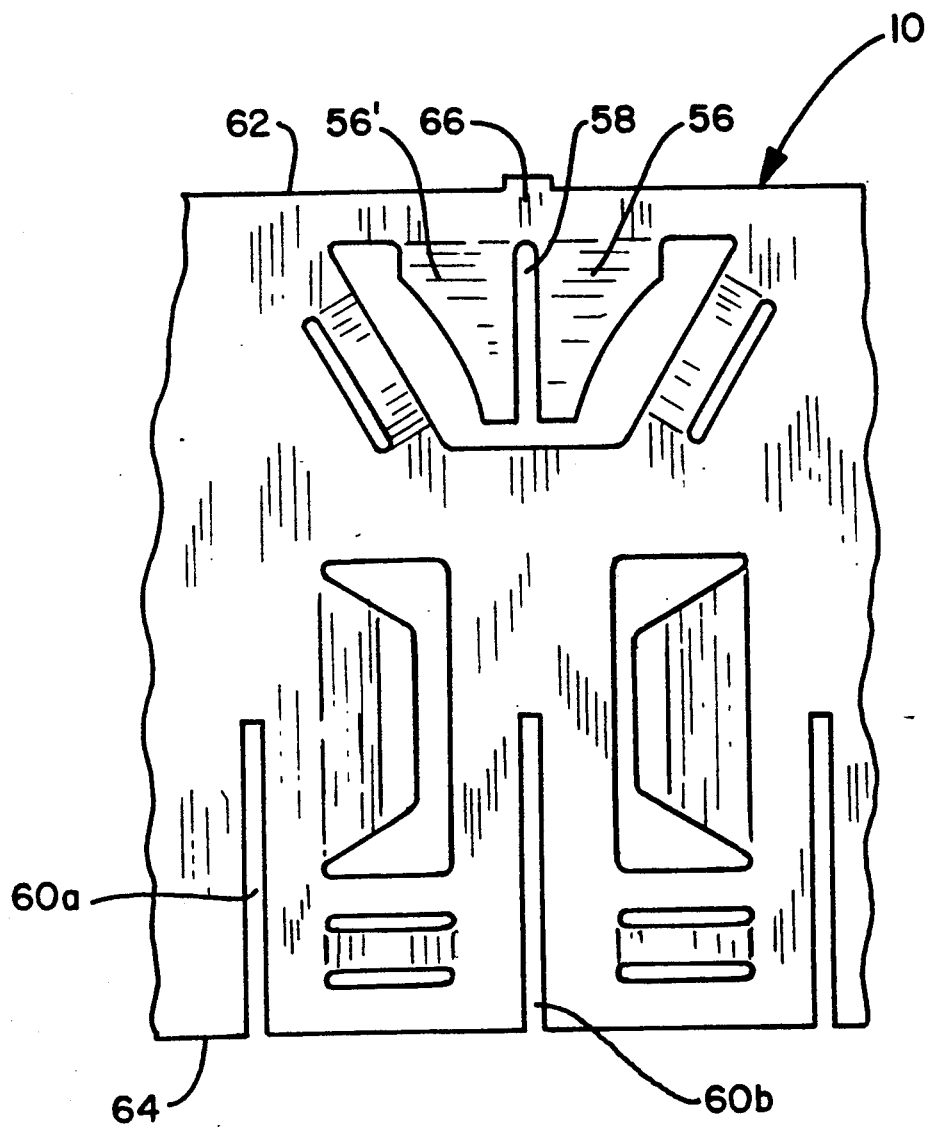
FIG. 5 is a view similar to FIG. 2, showing a portion of a grid strip in accordance with the present invention, that is oriented orthogonally to the strip shown in FIG. 2, in the grid arrangement shown in FIG. 1.

FIGS. 1-5 will now be described with particular attention to features related to the novel aspects of the present invention. The flow deflecting vane structure shown generally as 22 and 36 in FIG. 1, is described in greater detail with reference to the grid strip 12, as viewed along section line 2—2. This view as shown in FIG. 2, omits the fuel rods for clarity. The grid strip 12 is shown in FIG. 2 as part of a configured grid, such that orthogonal strips 10A, 10B are welded to strip 12. Before welding, strips 10, which have vertical slots 60A, 60B as shown in FIG. 5, are lowered through respective slots 38B, 38A in strips 12 as shown in FIG. 3, to form the interlaced structure in which the interlaced strips have a substantially uniform height dimension. For purposes of the present invention, the only significant difference between strips of type 10 and strips of type 12, is that the former has the slots formed at the lower edge and extending toward the strip mid line, whereas the latter has the slots extending from the upper edge toward the strip mid line. In general, each resulting cell will thus have two spring members and four arches contacting the fuel rod.

As shown in FIGS. 2-4, a typical cell wall includes a first cutout 28 situated substantially centrally between the upper and lower edges 24, 26 of the strip 12, the cut out defining a first cantilevered member 30 bendable away from the plate (i.e., into or out of the plane of the paper in FIG. 2), to form a fuel rod spring support member. Integrally formed protrusions 34,32 are situated above and below each of the first cut outs 28, for defining fuel rod stop support members, which are typically in the form of arches.

In accordance with the present invention, a second cut out 46 is situated between an adjacent first cut out 28 and one, preferably the upper, edge 24, to define a second cantilevered member 36 projecting toward the first cut out 28 and bendable away from the plate to form a coolant flow deflecting vane between the upper and lower edges 24, 26.

The strip 12 as formed by cut outs from a flat plate, repeats a pattern of fuel rod support and vane structure at regular intervals along the length of the plate, corresponding to the fuel rod pitch, i.e., to the cell spacing. Preferably, as shown in FIG. 3, two vanes 36, 36' can be formed as pairs which have a common slot 38B between them, the slot as shown in FIG. 3 extending from the upper edge 24. In the strips 10 shown in FIG. 5, which have the strip intersection slots 60A, 60B at the lower edge 64, the common slot 58 associated with the vanes 56, 56' does not extend to the edge 62, but rather leaves an uninterrupted band of metal 66 adjacent the upper edge 62. Although the upper end of slot 38B in the strips 12 shown in FIG. 3 extends to the upper edge 24, the welding of the upper edge of a strip such as 10B at the upper edge intersection, can be made without interference from the vanes 36, 36'. The weld provides a rigid connection of strip 10B to strip 12, at the portions of strip 12 that are on either side of the slot 38B at the edge 24.

The vanes 36 are bendable along a bend line 52 which defines a base that is spaced below the upper edge 24 of the strip, thereby leaving a margin 40 of metal between the vane 36 and the upper edge 24. The vertical thickness of the margin 40 is typically about 0.1 to 0.2 inch. The bend line 52 is preferably parallel to the upper edge 24. The vane 36 is preferably bent into or out of the plane of the paper (i.e., relative to the plate surface), at an angle in the range of about 10-30 degrees, with the vane oriented generally downward.

The common slot 38B extends from the upper edge 24 into the plate, equidistant between two consecutive first cut outs 28, 28'. The two cantilevered tabs forming vanes 36, 36' are symmetrically situated laterally on either side of the slot 38B, each tab having a base 40 integrally formed in the plate adjacent the edge 24, a straight side extending from the base and forming a boundary 39 of the slot, a curved side 42 extending from the base, and a free end 44 opposite the base and pointing generally toward the first cut out 28.

Preferably, the second cut out includes an open area 46 extending laterally from the curved side 42 of the vane to the upper protrusion, or stop member 34. Each of the protrusions 34, 32 is substantially vertically aligned with one of the first cut outs 28, and each of the second cut outs 46 is substantially laterally adjacent to one of said protrusions such as 34. Preferably, the open area 46 forms a border 48 of the said protrusion 34. The other border of protrusion 34 is formed by another cut out 50. The border 48, protrusion 34, and cut out 50 are preferably angled obliquely, e.g., 30 degrees, relative to the vertical slot 38B. The protrusion is preferably formed as an integral arch which extends in a direction which is either opposite to that of the adjacent vane (as shown in FIG. 4), or in the same direction.

It should be appreciated that the pattern of springs, stops, and vanes as one progresses longitudinally along a grid strip, may not be the same for every strip in a particular grid. For example, as shown in FIG. 1, with respect to the strip to which the lead line for numerical identifier 12 is connected, the pattern includes a stop 34' projecting south, the adjacent van 36' projecting north, the adjacent vane 36 projecting south, and the adjacent stop 34 projecting north. This is the same as shown in FIG. 4. A cross strip such as 10A in FIG. 1, may include a pattern such as stop 54' facing east, vane 56' facing east, adjacent vane 56 facing west, and adjacent stop 54 facing west. In general, in a given channel wall, the upper and lower protrusions 34, 32 face in the same direction, which is opposite to the direction in which the intervening spring 30 faces. A particular vane associated with a particular channel, may thus project in the same direction or in the opposite direction relative to its adjacent projecting stop member. Moreover, some cells may have one, two, or three vanes projecting therein.

As is well known, the regular pattern of cells in a grid is usually interrupted by the presence of guide tubes or thimbles. The number and direction of the vanes according to the present invention, can be configured at the cell walls adjacent the guide tubes, to redistribute coolant flow from the channel containing the guide tube, to adjacent channels which contain fuel rods. Given the fundamental features of the present invention as described herein, one of ordinary skill in this field can specify the particular strip configurations of the intersecting members, in order to arrive at a grid that optimizes flow mixing taking into account the effects of the presence of guide tubes, perimeter strips, and power distribution among the fuel rods.

I claim:

1. A grid strip for a nuclear fuel rod assembly, comprising:
   a thin plate having a length and a substantially uniform height between upper and lower edges;
   a plurality of first cut-outs spaced along the length of the plate substantially centrally between the upper and lower edges, each cut out defining a first cantilevered member bendable away from the plate to form a fuel rod spring support member;
   upper and lower integrally formed protrusions situated above and below each of said first cut-outs, for defining fuel rod stop support members; and
   a plurality of second cut-outs spaced along the length of the plate, each of the second cut outs situated between one adjacent first cut out and one of said edges, and defining a second cantilevered member projecting toward said adjacent first cut out and bendable away from the plate to form a coolant flow deflecting vane between the upper and lower edges.

2. The grid strip of claim 1, wherein each second cut out is bendable along a bend line that is parallel to said one edge.

3. The grid strip of claim 1, wherein each of the protrusions is substantially vertically aligned with one of the first cut outs, and each of the second cut outs is substantially laterally adjacent to one of said protrusions.

4. The grid strip of claim 1, wherein at least some of the second cut outs are formed as one of a pair of second cutouts which have a common slot between them, the slot extending to said one edge.

5. The grid strip of claim 2, wherein the bend line is between about 0.1 to 0.2 inch from said one edge.

6. The grid strip of claim 2, wherein said one edge is the upper edge.

7. The grid strip of claim 4, wherein the pair of second cutouts is defined by,
   said common slot extending from the upper edge into the plate equidistant between two consecutive first cut outs and,
   two cantilevered tabs symmetrically situated laterally of the slot, each tab having a base integrally formed in the plate adjacent said one edge, a straight side extending longitudinally from the base and forming a boundary of the slot, a curved side extending from the base, and a free end opposite the base and pointing generally toward the adjacent first cut out.

8. The grid strip of claim 7, wherein the second cut out includes an open area extending laterally from the curved side of the tab to the upper protrusion.

9. The grid strip of claim 8, wherein said open area and said upper protrusion extend generally obliquely along the plate.

10. A nuclear fuel assembly grid of the type having a plurality of flat strips that are orthogonally interlaced along vertical slots through their upper or lower edges and welded together to form an egg crate-like array of four-walled, four-cornered cells for receiving respective fuel rods, each cell including means projecting from each wall for contacting and supporting said respective fuel rod in the interior of the cell, wherein the improvement comprises at least some of the cells having elongated flow deflection vanes projecting integrally from one cell wall between said upper and lower edges at a corner of the cell and parallel to an adjacent wall along the longitudinal dimension of the vane, into the interior of the cell without contacting the fuel rod.

11. The grid of claim 10, wherein the means projecting from each wall for contacting the fuel rod includes a cantilevered spring, and the flow deflection vanes project downwardly from the wall between said spring and the upper edge of the wall.

12. The grid of claim 11, wherein the vane is in the form of a cut out defining a cantilevered member bent to project into the cell, and the bend line of the cut out is parallel to the upper edge.

13. The grid of claim 11, wherein the vane is bent to form an angle relative to the plate, in the range of 15-30 degrees.

* * * * *